United States Patent
Choi et al.

(10) Patent No.: US 8,311,520 B2
(45) Date of Patent: Nov. 13, 2012

(54) SYSTEM AND METHOD FOR PROVIDING USER-CUSTOMIZED MOBILE ADVERTISING SERVICE

(75) Inventors: Seok-Hoon Choi, Seongnam-si (KR); Hae-Young Jun, Anyang-si (KR); Ji-Hye Lee, Suwon-si (KR)

(73) Assignee: Samsung Electronics Co., Ltd (KR)

(*) Notice: Subject to any disclaimer, the term of this patent is extended or adjusted under 35 U.S.C. 154(b) by 413 days.

(21) Appl. No.: 12/575,081

(22) Filed: Oct. 7, 2009

(65) Prior Publication Data
US 2010/0087177 A1    Apr. 8, 2010

(30) Foreign Application Priority Data
Oct. 7, 2008  (KR) .................. 10-2008-0098206

(51) Int. Cl.
*G06Q 30/00*   (2012.01)
(52) U.S. Cl. ......................................... 455/414.1; 705/5
(58) Field of Classification Search ............... 455/414.1, 455/414.2, 435.1; 705/5, 50, 64, 67
See application file for complete search history.

(56) References Cited

U.S. PATENT DOCUMENTS
2002/0160766 A1   10/2002  Portman et al.
2003/0093318 A1*   5/2003  Komaki et al. ................. 705/14
2006/0173781 A1*   8/2006  Donner ........................... 705/50
2007/0105571 A1    5/2007  Choi et al.

FOREIGN PATENT DOCUMENTS
| KR | 1020000050071 | 8/2000 |
| KR | 1020010044637 | 6/2001 |
| KR | 1020030047930 | 6/2003 |
| KR | 1020050114967 | 12/2005 |
| KR | 1020070048415 | 5/2007 |
| KR | 1020070053090 | 5/2007 |
| KR | 1020070117012 | 12/2007 |
| KR | 1020080042248 | 5/2008 |

* cited by examiner

*Primary Examiner* — Sam Bhattacharya
(74) *Attorney, Agent, or Firm* — The Farrell Law Firm, P.C.

(57) ABSTRACT

A method for a user to receive an advertisement directly reflecting the user's liking. When a client registers event information set by a user into a server, the server provides a corresponding advertisement by retrieving if there exist advertisements corresponding to the event information registered into that server. Also, the client registers both event information and preference information into the server considering the liking of the user. By doing this, the user can receive an advertisement directly reflecting his liking. Also, the user information can be protected by only outputting the information into a mobile terminal.

16 Claims, 3 Drawing Sheets

SYSTEM AND METHOD FOR PROVIDING USER-CUSTOMIZED MOBILE ADVERTISING SERVICE

PRIORITY

This application claims priority under 35 U.S.C. §119(a) to an application entitled "System and Method For Providing User-Customized Mobile Advertising Service" filed in the Korean Industrial Property Office on Oct. 7, 2008 and assigned Serial No. 10-2008-0098206, the contents of which are incorporated herein by reference.

BACKGROUND OF THE INVENTION

1. Field of the Invention

The present invention relates generally to a mobile advertising system for providing a differentiated, customized Mobile Advertising (hereinafter MobAd) service to a user, and more particularly to a system and a method for providing a user-customized mobile advertising service using a piece of event information.

2. Description of the Related Art

The Open Mobile Alliance (hereinafter OMA) is a standards body which develops standards for the interaction of separate mobile solutions. The OMA serves to mainly prescribe various application standards for such services as mobile games and Internet services. In particular, Open Mobile Alliance Requirement Working Group (OMA REQ) and Open Mobile Alliance Content Delivery Working Group (OMA CD) among OMA working groups are developing a technology standard for a MobAd service.

The mobile advertising service refers to a technology that transmits music, graphic, voice or text-based customized advertisements through a wireless terminal such as a cellular phone or a Personal Data Assistant (PDA), to a mobile terminal user. At present, there are several solutions supporting such mobile advertising services; however, compatibility and popularity of these solutions is lacking because the respective companies and providers use their own software. In order to solve this problem, the OMA is in the course of establishing the related technologies as a MobAd standard.

There are three main characteristics of a mobile advertising service. First, it can configure an information database for a user and realize a differentiated, personalized advertisement. That is, since a user always carries a mobile terminal, any selected advertisement can be transmitted to that user terminal in a period determined by a provider or according to a user's request, and advertisements through such a mobile terminal are always exposed to the user. Second, a mobile advertisement service can have an interactive characteristic. Specifically, because the mobile advertisement service can provide information on an advertisement that a user desires beforehand and can also provide a telephone number or a Uniform Resource Locator (URL), a user can actively access the service and obtain more detailed information on products. Third, a mobile advertisement service can measure metrics of a user. This is, a mobile terminal can receive a response of a user who is exposed to advertisements, since it is involved in interactive media. This metrics enables analysis of a user's preference and can be used for marketing purposes.

Hereinafter, specific examples of the prior art technologies and the present invention will be described based on OMA REQuest/Content Distribution (REQ/CD) MobAd (Mobile Advertising)]. However, it is appreciated that the present invention is not limited to such description.

A conventional mobile advertisement system can provide a customized advertising service based on preference or context information related to user profile information, but it does not consider a customized advertisement service based on a corresponding event information which a user created dynamically and also directly.

As such, because the prior art mobile advertising system does not provide a user with an opportunity to select an event, the received advertisement may be a partial customized advertisement or can be handled as spam. Moreover, bandwidth consumption occurs due to an advertisement transfer that the user does not desire. Thus, if one mobile advertising system provides a mobile advertisement reflecting event information and preference information dynamically set by a user, it is possible to present a more differentiated mobile advertisement service.

Consequently, there exists a necessity in the art for providing a differentiated method and apparatus for transmitting/receiving preset event information and event-related advertisement service to/from a user or a recipient designated by the user, according to event information (for example, anniversaries, birthdays, and meetings) and preference information set by a user.

SUMMARY OF THE INVENTION

Accordingly, the present invention has been made to solve the above-mentioned problems occurring in the prior art, and the present invention provides a system and a method for presenting a user-customized mobile advertising service to provide an advertisement reflecting a liking directly set by a user.

Also, the present invention provides a system and a method for presenting a user-customized mobile advertising service to provide an advertisement reflecting an event or a preference set by a user.

In accordance with the present invention, there is provided a method of providing a user-customized mobile advertisement service in a mobile advertisement system, including receiving event information from a user at a client under the condition of being provided with a desired advertisement, registering the received event information into a server by the client, and providing an advertisement from the server based on the received event information.

In accordance with the present invention, there is provided a mobile advertisement system for providing a user-customized mobile advertisement service, including a client for receiving event information from a user under the condition of being provided with a desired advertisement and transmitting the received event information, and a server for storing the event information from the client, retrieving an advertisement corresponding to the stored event information, and providing the retrieved advertisement.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS

Figure 1:
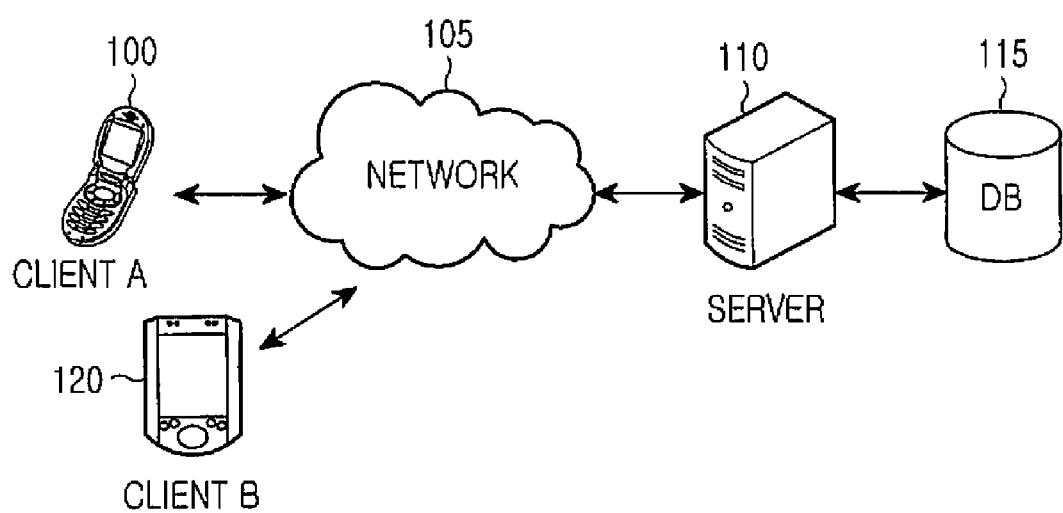
FIG. 1 illustrates a mobile advertisement system according to the present invention.

Hereinafter, embodiments of the present invention will be described with reference to the accompanying drawings. In the drawings, the same elements will be designated by the same reference numerals throughout the entirety of the drawings. Further, a detailed description of known functions and configurations incorporated herein will be omitted for the sake of clarity and conciseness.

The present invention provides a method of presenting an advertisement reflecting the preference of the user. Particularly, when a client registers a piece of event information set by a user into a server, the server retrieves and presents the corresponding advertisement if there is an advertisement corresponding to the event information registered into a server. Also, in the present invention, a client can register event information and preference information into a server by considering the likings of a user. By doing this, the user side can be provided with an advertisement directly reflecting the user's liking.

FIG. 1 illustrates a mobile advertisement system according to the present invention.

Referring to FIG. 1, the mobile advertisement system includes one or more clients 100 and 120, a network 105, a server 110 and a database (DB) 115.

First, client A (100) and client B (120) refer to a means for requesting a server 110 of a user-customized mobile advertisement service or receiving a service via a network 105 according to a request from a user. In the following description, it is supposed that user A owns client A (100) and user B owns client B (120).

The server 110 provides a mobile advertising service, and particularly, it stores a piece of event information and preference information transmitted from clients in a database 115. Also, the server 110 retrieves a corresponding advertisement using the stored information periodically or as needed. If the corresponding advertisement is retrieved, a server 110 transmits the retrieved advertisement to a client of a designated user via a network 105 by referencing the above-mentioned event information.

The database 115 stores the event information and the preference information for each client transmitted from clients. The event information includes such information as anniversaries, birthdays, a meeting, and appointment date, place and time, and the preference information includes such information as the user's interest and tastes. The database 115 may exist in the server 110.

Figure 2:
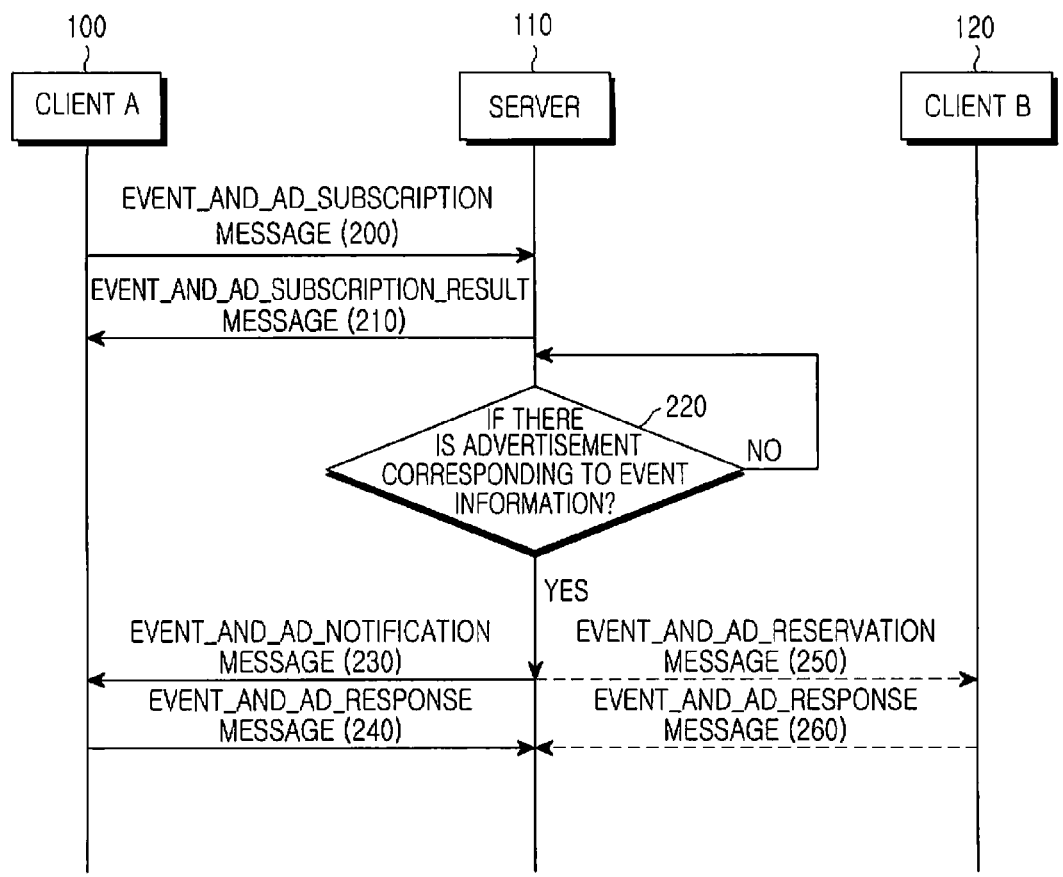
FIG. 2 is a message flowchart among the components of a mobile advertisement system for providing a user-customized advertisement service according to the present invention.

FIG. 2 is a message flowchart among the components of a mobile advertisement system for providing a user-customized advertisement service according to the present invention. Specifically, FIG. 2 illustrates a specific procedure wherein user A and user B designated by user A receive a customized advertisement based on event information set by user A.

First, a user A must perform a subscription to access the server 110 through its own client A (100) to receive a desired advertisement. The user A designates a subject for receiving an advertisement and sets event information to deliver a desired advertisement to the designated subject. Herein, user A can designate him or herself or one or more other users as a subject/subjects intended to receive an advertisement. Also, user A can set the event information and a piece of preference information representing his or her interest.

As such, when user A sets the event information and preference information, the client A (100) transmits a message including the set details to the server 110 in step 200. An Event_and_Ad_Subscription message can be used as the message including the set details. An example of the configuration of the Event_and_Ad_Subscription message is shown in Table 1A and Table 1B. Here, Tables 1A and 1B form a single table, and Table 1B is a continuation of Table 1A.

TABLE 1A

| Name | Type | Category | Cardinality | Description | Data Type |
|---|---|---|---|---|---|
| Event and Ad Subscription Request ID | A | M | 1 | ID of the Event and Ad Subscription Message, globally unique | Any URI |
| Version | A | O | 1 | Version of Event and Ad Subscription Message, globally unique. The newer version overrides the older one | unsignedInt |
| User-Information | E1 | O | O...N | The set of user information who consumes the event, (e.g. age, gender and occupation) | string |
| Name | A | O | 1 | Specify the name of user who requests the subscription of the event, possibly in multiple languages. | string |

TABLE 1A-continued

| Name | Type | Category | Cardinality | Description | Data Type |
|---|---|---|---|---|---|
| Event-Type | A | O | 1 | The type of reserved event, (e.g. Anniversary, birthday, meeting etc.) | unsignedByte |
| Date | A | M | 1 | The date on which some event took place | unsignedInt |

TABLE 1B

| Name | Type | Category | Cardinality | Description | Data Type |
|---|---|---|---|---|---|
| Place | A | O | 1 | The geographic area or position such as a country, city, town, village, etc which some event took place | string |
| Time | A | O | 1 | The time of date which some event took place | string |
| Alarm | A | O | 1 | Notification time of the Event (e.g 3 days prior; 15 mins prior; etc.) | string |
| Event Description | A | O | 1 | Description of reserved event | string |
| Preferred Language | A | O | 1 | Language in which the advertisement is given | string |
| Target-User | A | O | O . . . N | Specify the list of users belonging to the group or an individual user whom the service is targeting (e.g name, tel-number, e-mail, etc.). | string |
| Reserved Event Valid Period | A | O | O . . . 1 | Specifies the duration of the reserved event | unsignedByte |
| User-Preference | E1 | O | O . . . N | Contains detailed sub-attributes of criteria recognized by Service Provider to transmit the advertisement (e.g; Genre, Brand etc.) If several preference criteria are present at the same time, all those criteria apply to the set of request | |

In Table 1A and Table 1B, 'Event and Ad Subscription Request ID' refers to an item assigned to identify the type of message sent to a server.

'Version' indicates the version of the Event_and Ad_Subscription message, and this 'Version' item is used to substitute for a previous message when an Event_and_Ad_Subscription message is received from the server. When receiving an older version of the event and advertisement subscription request information compared to the current Event_and_Ad_Subscription message, the old message is deleted and is not stored. 'User-Information' indicates static information of a user who set the event information, and includes age, sex, occupation and the like. 'Name' indicates the name of the user requesting the advertisement delivery, and can be declared in various languages.

'Event-Type' indicates the type of booked event, such as an anniversary, a birthday, or a meeting. 'Place' indicates the location where an event occurs, such as country, city, town, or village. 'Time' indicates the time when the event occurs, and 'Alarm' refers to an item for informing the occurrence of a set event. F or example, 'Alarm' indicates an event notification time, such as 3 days ago or 15 minutes ago. 'Event Description' indicates the description of a booked event, 'Preferred Language' indicates the language used in the advertisement desired to be received, and 'Target-User' indicates a user list or an individual user that belongs to a group destined to receive the advertisement. 'Reserved Event Valid Period' indicates the duration time of a booked event. 'User-Preference' refers to the detailed attribute of a standard recognized by a service provider that delivers an advertisement according to preference criteria set in order for a user to receive a customized advertisement from a server based on a piece of user information. Herein, several preference criteria of the user information can be set at a time, and the set criteria all apply to the corresponding user information.

Hereinafter, in order to facilitate a better understanding of the present invention, an example wherein user A receives an advertisement for his wedding anniversary will be described. It is assumed that user A wants to be notified one day before advertisements are sent regarding Indian and Italian restaurants near Gang-Nam station for his wedding anniversary that will be at 19:00 on 20XX.YY.ZZ. In this case, client A generates an Event_and_Ad_Subscription message where he sets wedding anniversary information in 'Event Type', time information of 20XX.YY.ZZ, 19:00 in 'Date', location information of Gang-Nam station in 'Place', notification time of one day before in 'Alarm', and preference 30 information of India and Italy restaurants in 'User-Preference', and then delivers it to the server 110.

When the server 110 receives the Event_and_Ad_Subscription message, the server stores event information and preference information contained in the Event_and_Ad_Subscription message in the database 115. Then, the server 110 has to transmit a response message to user A indicating that the settings for the anniversary set by user A have been properly registered. Thus, the server 110 delivers a response message regarding that message reception to the client A 100 (step 210). An Event_and_Ad_Subscription_Result message can be used as this response message. An example of the configuration of this message is shown in Table 2.

TABLE 2

| Name | Type | Category | Cardinality | Description | Data Type |
|---|---|---|---|---|---|
| Event and Ad Subscription Result ID | A | M | 1 | ID of the Event and Ad Subscription Result Message, globally unique | anyURI |

TABLE 2-continued

| Name | Type | Category | Cardinality | Description | Data Type |
|---|---|---|---|---|---|
| Event and Ad Subscription ID | A | M | 1 | ID of the Event and Ad Subscription Message, globally unique | AnyURI |
| Status | A | M | 1 | The overall outcome of the subscription such as error conditions corresponding to the request | String |

In Table 2, 'Event and Ad Subscription Result ID' refers to an item for indicating a response message to the Event_and_Ad_Subscription message, and this item is assigned in order for a server to identify the type of message to be sent to the client who delivered that message. 'Event and Ad Subscription Request ID' is the same as described in Table 1A and Table 1B, and 'Status' indicates status information, such as transmission success, transmission failure and the failure reason, of the Event_and_Ad_Subscription message.

Next, a server 100 retrieves the corresponding advertisement based on the details set by user A. Thus, the server 110 retrieves if there is an advertisement corresponding to the stored event information (step 220). For example, the server 110 determines whether a date corresponding to the day before 20XX.YY.ZZ is approaching and there are advertisements related to the corresponding location, namely Gang-Nam station. Also, the server 110 determines whether there are advertisements related to Indian and Italian restaurants near Gang-Nam station based on the preference information. If an advertisement satisfying such set details is retrieved, the server 110 delivers a notification message informing that the retrieved advertisement exists, to the client A (step 230). An Event_and_Ad_Notification message can be used as the notification message. An example of the configuration of such an Event_and_Ad_Notification message is shown in Table 3A and Table 3B. Here, Tables 3A and 3B form a single table, and Table 3B is a continuation of Table 3A.

TABLE 3A

| Name | Type | Category | Cardinality | Description | Data Type |
|---|---|---|---|---|---|
| Event and Ad Notification ID | A | M | 1 | ID of the Event and Ad Notification Message, globally unique. | Any URI |
| Event and Ad Subscription ID | A | M | 1 | ID of the Event subscription Message, globallyunique | Any URI |
| Name | A | O | 1 | Specify the name of user who requests the subscription of the event, possibly in multiple languages | string |
| Event-Type | A | O | 1 | The type of reserved event, (e.g Anniversary, birthday, meeting, etc) | UnsignedByte |
| Date | A | M | 1 | The date on which some event took place | unsignedInt |

TABLE 3B

| Place | A | O | 1 | The geographic area or position, such as a country, city, town, village, etc which some event took place | string |
|---|---|---|---|---|---|
| Time | A | O | 1 | The time of date which some event took place | string |
| Event Description | A | O | 1 | Description of reserved event. | string |
| Target-User | A | O | 0...N | Specify the list of users belonging to the group or an individual user whom the service is targeting (e.g. name, tel-number, e-mail, etc.). | string |
| User-Preference | E1 | O | 0...N | Contains detailed sub-attributes of criteria recognized by Service Provider to transmit the advertisement (e.g. Genre, Brand, etc.) If several preference criteria are present at the same time, all those criteria apply to the set of request. | |

TABLE 3B-continued

| | | | | |
|---|---|---|---|---|
| Advertisement | A | M | O...N | The advertisement that matches User Preference and specified event. |

In Tables 3A and 3B, 'Event and Ad Notification ID' refers to an item assigned to identify the type of message to be sent to the client. 'Event and Ad Subscription ID' indicates an ID of an event subscription message. The description of the remaining items, such as 'Name', 'Event-Type', 'Date', 'Place', 'Time', 'Event Description', 'Target-User' and 'User-Preference', of an Event_and Ad_Notification message is omitted as the description is the same as in the above-described Tables 1A and 1B. Since the Event_and_Notification message is used for delivering an advertisement reflecting details set by user A, 'Advertisement' item is added. In 'Advertisement', one or more advertisement retrieved by the server 110 is/are inserted.

Client A (100), which received the aforementioned Event_and_Ad_Notification message, transmits an Event_and_Ad_Response message to the server 110 in response to the message reception (step 240). An example of the configuration of an Event_and_Ad_Response message 110 is shown in Table 4.

TABLE 4

| Name | Type | Category | Cardinality | Description | Data Type |
|---|---|---|---|---|---|
| Event and Ad Response ID | A | M | 1 | ID of the Event and Ad Response Message, globally unique | AnyURI |
| Event and Ad Notification ID | A | M | 1 | ID of the Event and Ad Notification Message, globally unique | anyURI |
| Status | A | M | 1 | The overall outcome of the Event and Ad Notification such as error conditions corresponding to the requests | String |
| Advertisement | A | O | O...N | The advertisement that is selected by User among the provided advertisements within Event and Ad Notification Message | |

In Table 4, 'Event and Ad Response ID' indicates a response message to Event and Ad Notification Message, and is assigned in order for a client to identify the type of message to be sent to the server which delivered that message. 'Event and Ad Notification ID' indicates the ID of an event notification message. 'Status' indicates status information, such as transmission success, transmission failure and the failure reason, of Event_and_Ad_Notification Message. When this response is transmitted, 'Advertisement' item is added to provide to the server information regarding an advertisement selected by a user and an advertisement with which an interaction is performed, such as booking a restaurant. Also, at the same time as the response is transmitted, client A (100) can display Indian and Italian restaurants advertisements along with an anniversary notice message for user A.

Thus, user A can select a desirable place to go to the next day through confirming the anniversary and viewing restaurant advertisements, namely on the wedding anniversary. As such, according to the present invention, a user receives a desired advertisement so that he/she can perform an interaction such as viewing and booking a restaurant.

When user A designates himself or one or more other users as an advertisement receiving subject, the server 110 delivers the retrieved advertisement to the corresponding other subjects. Specifically, the server 110 identifies an advertisement delivery subject based on information corresponding to 'Target=User' among a piece of event information stored in the database 115. After identifying the advertisement delivery subject, the server 110 delivers the retrieved advertisement to the identified subject as well. If there exist more than one advertisement delivery subjects so that an advertisement must be transmitted to both client A (100) and client B (120), the server 110 transmits Event_and_Ad_Reservation message including the advertisement (step 250) and then receives the corresponding Event_and_Ad_Response message. The description of the examples of the configuration of the above-mentioned Event_and_Ad_Reservation message and Event_and_Ad_Response message will be omitted as these respective configurations are the same as the configuration of the above-described Event_and_Ad_Notification message and Event_and_Ad_Response message. Accordingly, other users designated by a user A besides the user A can view an identical advertisement to the user A.

Figure 3:
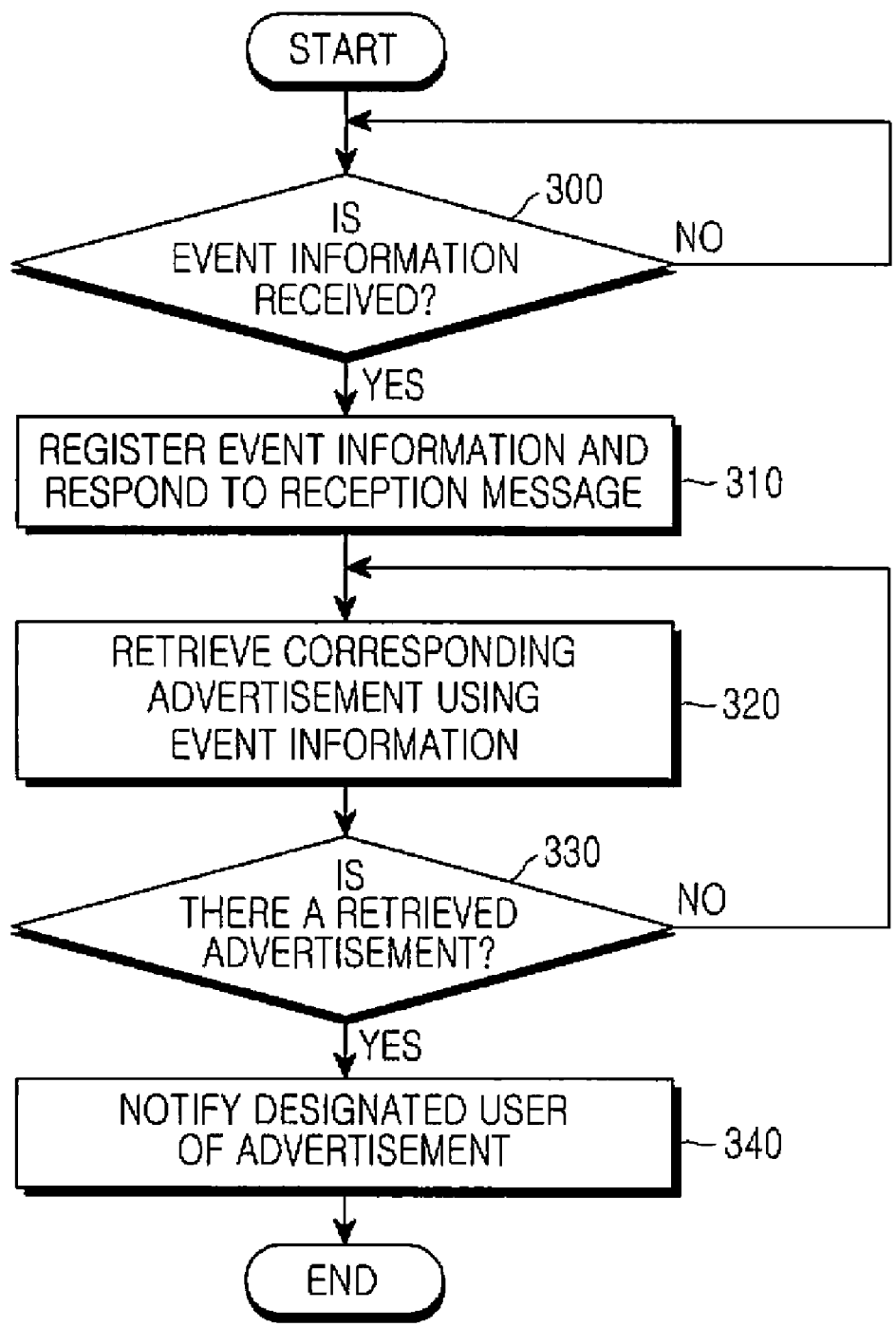
FIG. 3 illustrates the operation of a server for providing a user-customized advertisement service according to the present invention.

FIG. 3 illustrates the operation of a server for providing a user-customized advertisement service according to the present invention.

Referring to FIG. 3, the server 110 determines whether a piece of event information has been received (step 300 This event information is received as a state included in the Event_and_Ad_Subscription message. Then, the server 110 extracts the event information from the Event_and_Ad_Subscription message and registers it into the database 115, and after that registration is completed, then it transmits a response to that message reception to the corresponding client (step 310). Next, the server 110 retrieves the corresponding advertisement using the event information (step 320), and when there is a retrieved advertisement (step 330), it notifies a designated user of the advertisement (step 340).

As described above, the present invention provides a customized advertisement a user desires, and allows a user to have an interest in that advertisement. Thus, an advertiser can expect improved advertisement effects as well as greater profits.

According to the present invention, a user can acquire their liking directly reflected advertisements by setting event information and preference information in person. Also, a user can receive a wanted advertisement, and an advertisement service company can expect a response from the user and thus obtain sufficient advertisement effects.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of providing a user-customized mobile advertising service in a client terminal of a mobile advertisement system, comprising the steps of:
   receiving, from a user, at least one condition under which the user is to be provided with an advertisement;
   registering the at least one condition into a server; and
   receiving, from the server, an advertisement according to the at least one condition.

2. The method of claim 1, wherein the at least one condition includes at least one of a type of the advertisement, a date of providing the advertisement, a location of providing the advertisement, and a time of an advertisement notification.

3. The method of claim 1, further comprising receiving, from the user, preference information for the server providing the user-customized mobile advertising service based on the preference information.

4. The method of claim 3, wherein registering the at least one condition comprises:
   transmitting, to the server, an advertisement subscription message including the at least one condition and the preference information; and
   receiving, from the server, an advertisement subscription result message in a response to the advertisement subscription message.

5. The method of claim 3, wherein receiving the advertisement comprises receiving an advertisement notification message including the advertisement corresponding to the at least one condition and the preference information.

6. A mobile advertisement system for providing a user-customized mobile advertising service, comprising:
   a client terminal for receiving, from a user, at least one condition under which the user is to be provided with an advertisement and transmitting the received at least one condition to a server; and
   a server for storing the transmitted at least one condition, retrieving an advertisement corresponding to the stored at least one condition, and providing the retrieved advertisement to the client terminal; and
   at least one other client terminal for receiving the advertisement form the server if the transmitted at least one condition indicates at least two subjects intended to receive the advertisement.

7. The mobile advertisement system of claim 6, wherein the at least one condition includes at least one of, a type of the advertisement, a date of providing the advertisement, a location of providing the advertisement, a time of an advertisement notification, and the at least two subjects intended to receive the advertisement.

8. The mobile advertisement system of claim 6, wherein the client terminal further receives, from the user, preference information for the server providing the user-customized advertising service based on the preference information.

9. The mobile advertisement system of claim 8, wherein the client terminal transmits, to the server, an advertisement subscription message including the received at least one condition and the preference information, and receives, from the server, an advertisement subscription result message in response to the advertisement subscription message.

10. The mobile advertisement system of claim 8, wherein the server retrieves an advertisement corresponding to the at least one condition and the preference information and provides an advertisement notification message including the retrieved advertisement.

11. The mobile advertisement system of claim 7, wherein the server provides the retrieved advertisement to the at least two subjects intended to receive the advertisement according to an indication of the at least two subjects included in the transmitted condition.

12. A method of providing a user-customized mobile advertising service in a server of a mobile advertisement system, comprising the steps of:
   receiving, by the server, at least one condition under which a user is to be provided with advertisements from a client terminal;
   storing, by the server, the received at least one condition; and
   providing, by the server, an advertisement to the client terminal under the at least one condition set by the user.

13. The method of claim 12, wherein the at least one condition includes at least one of a type of advertisement, a date of providing the advertisement, a location of providing the advertisement, and a time of an advertisement notification.

14. The method of claim 12, further comprising receiving, from the client terminal, preference information for the server providing the user-customized advertising service based on the preference information.

15. The method of claim 14, wherein storing the received at least one condition comprises:
   receiving an advertisement subscription message including the received at least one condition and the preference information; and
   transmitting an advertisement subscription result message in a response to the advertisement subscription message.

16. The method of claim 14, wherein providing the advertisement comprises transmitting an advertisement notification message including the advertisement corresponding to the received at least one condition and the preference information.

* * * * *

UNITED STATES PATENT AND TRADEMARK OFFICE
CERTIFICATE OF CORRECTION

PATENT NO. : 8,311,520 B2  
APPLICATION NO. : 12/575081  
DATED : November 13, 2012  
INVENTOR(S) : Seok-Hoon Choi et al.

Page 1 of 1

It is certified that error appears in the above-identified patent and that said Letters Patent is hereby corrected as shown below:

In the Claims

Column 12, Claim 6, lines 1 and 2, "at least one other client terminal for receiving the advertisement form"

should be

Column 12, Claim 6, lines 1 and 2, --at least one other client terminal for receiving the advertisement from--.

Signed and Sealed this
Thirteenth Day of May, 2014

Michelle K. Lee
*Deputy Director of the United States Patent and Trademark Office*